US008971893B2

(12) United States Patent
Li et al.

(10) Patent No.: US 8,971,893 B2
(45) Date of Patent: Mar. 3, 2015

(54) APPARATUS AND METHOD FOR MANAGEMENT OF RADIO RESOURCE CONTROL CONNECTIONS

(71) Applicants: AT&T Intellectual Property I, LP, Atlanta, GA (US); AT&T Mobility II, LLC, Atlanta, GA (US)

(72) Inventors: Yunpeng Li, Austin, TX (US); Wenge Chen, Austin, TX (US); Jerry Jun, Austin, TX (US)

(73) Assignees: AT&T Intellectual Property I, LP, Atlanta, GA (US); AT&T Mobility II, LLC, Atlanta, GA (US)

(*) Notice: Subject to any disclaimer, the term of this patent is extended or adjusted under 35 U.S.C. 154(b) by 0 days.

(21) Appl. No.: 13/689,304

(22) Filed: Nov. 29, 2012

(65) Prior Publication Data

US 2014/0148169 A1    May 29, 2014

(51) Int. Cl.
*H04W 36/00* (2009.01)
*H04W 36/08* (2009.01)
*H04W 76/02* (2009.01)
*H04W 48/02* (2009.01)
*H04W 48/06* (2009.01)

(52) U.S. Cl.
CPC ............ *H04W 36/08* (2013.01); *H04W 76/027* (2013.01); *H04W 48/02* (2013.01); *H04W 36/0061* (2013.01); *H04W 48/06* (2013.01)
USPC ..... 455/437; 455/417; 455/435.1; 455/435.2; 455/436; 455/450

(58) Field of Classification Search
CPC ..... H04W 48/16; H04W 12/00; H04W 12/06; H04W 36/08; H04W 36/36; H04W 72/04; H04W 76/00; H04W 76/021; H04W 76/027; H04W 48/18; H04W 48/20; H04W 76/028; H04W 76/02; H04W 36/14; H04W 48/02; H04W 74/08; H04W 16/08; H04W 74/00
USPC ............... 455/435.1, 435.2, 436–444, 422.1, 455/67.11, 67.14, 445, 453, 452.2, 525, 455/450, 417; 370/328–338, 395.21
See application file for complete search history.

(56) References Cited

U.S. PATENT DOCUMENTS

| | | | |
|---|---|---|---|
| 8,358,594 B2* | 1/2013 | Lee et al. ....................... | 370/254 |
| 2004/0209593 A1* | 10/2004 | Alberth et al. ................ | 455/403 |
| 2010/0069127 A1* | 3/2010 | Fiennes ......................... | 455/574 |
| 2010/0291941 A1 | 11/2010 | Chen | |
| 2011/0199905 A1* | 8/2011 | Pinheiro et al. ............... | 370/235 |
| 2011/0201307 A1 | 8/2011 | Segure | |
| 2012/0015648 A1* | 1/2012 | Roberts et al. ............. | 455/426.1 |
| 2012/0281566 A1 | 11/2012 | Pelletier | |
| 2013/0003700 A1* | 1/2013 | Zhang et al. .................. | 370/331 |
| 2013/0084858 A1* | 4/2013 | Ramasamy et al. .......... | 455/434 |
| 2013/0095879 A1* | 4/2013 | Gupta et al. .................. | 455/525 |

* cited by examiner

*Primary Examiner* — Olumide T Ajibade Akonai
(74) *Attorney, Agent, or Firm* — Guntin & Gust, PLC; Joseph Hrutka

(57) ABSTRACT

A system that incorporates the subject disclosure may include, for example, accessing configuration information, monitoring for radio resource control connection requests being transmitted from the wireless communication device to a first server of a first cell of a network, determining whether failed radio resource control connection requests satisfy a cell barring threshold based on the monitoring and based on the configuration information, and responsive to a determination that the cell barring threshold has been satisfied, causing the wireless communication device to perform cell selection for a second cell of the network and to perform cell barring of the first cell. Other embodiments are disclosed.

20 Claims, 5 Drawing Sheets under the subject disclosure are not limited to just the management of RRC connections and can be applied to other communication protocols for which the management of communication sessions based on one or more thresholds would be desired.

APPARATUS AND METHOD FOR MANAGEMENT OF RADIO RESOURCE CONTROL CONNECTIONS

FIELD OF THE DISCLOSURE

The subject disclosure relates to an apparatus and method for management of radio resource control connections.

BACKGROUND

Communication devices can be used to provide services based on communication sessions established over a network. These communication sessions can be utilized for transmitting and receiving various data, including voice and video data.

Mobile wireless communications can involve requesting connections with cells which may or may not be accepted. These communications are according to various communication protocols. The protocols can establish procedures to be executed by the end user device, as well as by the network element(s), based on particular operating conditions.

BRIEF DESCRIPTION OF THE DRAWINGS

Reference will now be made to the accompanying drawings, which are not necessarily drawn to scale, and wherein.

DETAILED DESCRIPTION

Figure 1:
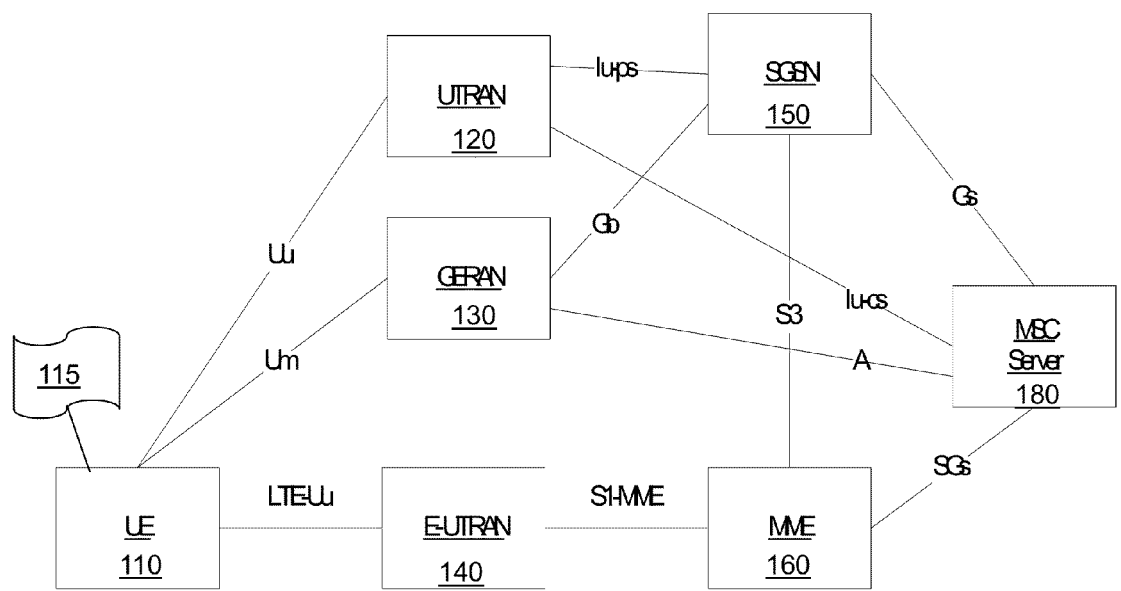
FIG. 1 depicts an illustrative embodiment of a communication system that provides communications services.

The subject disclosure describes, among other things, illustrative embodiments in which cell barring can be implemented by an end user device based on configuration information received from a network element, such as via Firmware-over-the-Air (FOTA) techniques. As an example, an end user device can monitor Radio Resource Control (RRC) connection requests being transmitted to a first cell and determine whether failed RRC connection requests sent to the first cell by the end user device satisfy a cell barring threshold. In this example, when the cell barring threshold is satisfied, the end user device can perform cell barring such that one or more subsequent RRC connection requests are transmitted to a second cell, such as based on a cell selection process performed by the end user device. In one or more embodiments, the cell barring can be performed for a pre-determined time period such that the end user device can send another RRC connection request to the first cell after expiration of the pre-determined time period.

In one or more embodiments, the cell barring threshold can be based on a number and/or a time period for the transmitted failed RRC connection requests. In one or more embodiments, the cell selection process can be triggered based on satisfying the cell barring threshold(s) and the cell selection process can be performed without switching to a different Radio Access Technology (RAT), such as maintaining the use of an Evolved Universal Terrestrial Radio Access Network (E-UTRAN) technology. However, the exemplary embodiments can switch cells, can switch RATs and/or can switch Public Land Mobile Networks (PLMN's) responsive to satisfaction of the cell barring threshold(s).

Other embodiments are included in the subject disclosure.

One embodiment of the subject disclosure includes a computer-readable storage device comprising computer instructions, which, responsive to being executed by a processor of a wireless communication device, cause the processor to perform operations comprising receiving configuration information over a network, where the configuration information includes threshold parameters for a maximum number of connection requests and a maximum time period for transmitting the connection requests. The computer instructions enable monitoring for radio resource control connection requests being transmitted from the wireless communication device to a first server of a first cell of the network. The computer instructions enable determining a number of failed radio resource control connection requests based on the monitoring. The computer instructions enable determining a time of a first failed radio resource control connection request of the failed radio resource control connection requests based on the monitoring. The computer instructions enable determining whether the number of failed radio resource control connection requests and the time of the first failed radio resource control connection request satisfy a cell barring threshold based on the threshold parameters. The computer instructions enable, responsive to a determination that the cell barring threshold has been satisfied, causing the wireless communication device to perform cell selection for a second cell of the network and to perform cell barring of the first cell.

One embodiment of the subject disclosure is a method that includes receiving, by a processor of a wireless communication device, configuration information over a network. The method includes monitoring, by the processor, for radio resource control connection requests being transmitted from the wireless communication device to a first server of a first cell of the network. The method includes determining, by the processor, whether failed radio resource control connection requests satisfy a cell barring threshold based on the monitoring and based on the configuration information. The method includes responsive to a determination that the cell barring threshold has been satisfied, causing the wireless communication device to perform cell selection for a second cell of the network and to perform cell barring of the first cell.

One embodiment of the subject disclosure includes a wireless communication device including a memory to store instructions, and a processor coupled to the memory. The processor, responsive to executing the instructions, can perform operations comprising accessing configuration information and monitoring for radio resource control connection requests being transmitted from the wireless communication device to a first server of a first cell of a network. The processor can determine whether failed radio resource control connection requests satisfy a cell barring threshold based on the monitoring and based on the configuration information. The processor can, responsive to a determination that the cell barring threshold has been satisfied, cause the wireless communication device to perform cell selection for a second cell of the network and to perform cell barring of the first cell.

Referring to FIG. 1, a mobile communication system 100 is illustrated that can provide communication services, including voice, video and/or data services to mobile devices, such as end user device 110. System 100 can enable communication services over a number of different networks, such as between end user device 110 and another communication device (e.g., a second end user device) not shown. End user device 110 can be a number of different types of devices that are capable of voice, video and/or data communications, including a mobile device (e.g., a smartphone), a personal computer, a set top box, and so forth. End user device 110 can include computer instructions and/or hardware to perform service request and cell selection management functions 115. The management functions 115 can include performing cell barring at the end user device 110 in response to detecting or otherwise determining certain circumstances associated with failed RRC connection requests (e.g., failed consecutive requests). The failed RRC connection requests can be requests that have been rejected, ignored or otherwise are unsuccessful in providing an RRC connection (e.g., the end user device 110 does not receive in response to the request an RRCConnectionSetup message and/or does not transmit an RRCConnectionSetupComplete message). For instance, the end user device 110 can monitor the number of consecutive failed RRC requests that have been sent to a first cell and also monitor the time period over which these failed consecutive RRC connection requests were sent. If the failed consecutive RRC connection requests satisfy cell barring thresholds then the end user device 110 can prevent RRC connection requests from being transmitted to the first cell (e.g., a first server of the first cell), such as over a pre-determined time period, while enabling the end user device 110 to select a second cell and transmit one or more subsequent RRC connection requests to the second cell in an effort to establish an RRC connection with the second cell.

In one or more embodiments, the cell barring thresholds can be determined based on configuration information that is received from a remote source, such as a server associated with the first cell, although other network elements and/or other communication devices, including other end user devices, can provide the configuration information to the end user device 110. The configuration information can be threshold values (e.g., a maximum number of failed RRC connection requests and/or a maximum time period for transmitting RRC connection requests) that are directly utilized or otherwise directly applied by the end user device 110 in determining whether to perform cell barring. In another embodiment, the configuration information can be indirect information that can be analyzed to determine threshold values that are to be applied to determine whether cell barring should be performed. For instance, the indirect information can be historical traffic information indicating that at a particular time (e.g., time of day, day of week, etc.) an increased amount of traffic is received by a cell. In this example, based on the historical information, the end user device 110 can determine threshold values for the number of failed RRC connection requests and the time period for the failed RRC connection requests, and the threshold values can then be applied in determining whether cell barring is to be applied. Other indirect information can also be analyzed by the end user device 110 to determine the cell barring threshold values, such as performance metrics of the cell (e.g., latency, jitter, packet loss, and so forth), expected events that will impact cell traffic (e.g., scheduled maintenance), and so forth.

In one or more embodiments the configuration information, whether direct information, indirect information, or both, can be based on performing network load balancing to alleviate an overloaded cell. As an example, a cell may determine that it is experiencing an increased level of traffic, and may generate and transmit configuration information to various end user devices where the configuration information has decreased threshold values (e.g., lower threshold number of failed RRC connection requests and/or shorter threshold time period for the failed RRC connection requests) so that cell barring (and hence cell selection of different cell(s)) is more often performed by these end user devices which may alleviate the congestion at the cell. In one embodiment, upon a detection by the cell that it is experiencing lower levels of traffic, the cell may generate and transmit configuration information to various end user devices where the configuration information has increased threshold values (e.g., higher threshold number of failed RRC connection requests and/or longer threshold time period for the failed RRC connection requests) so that cell barring (and hence cell selection of different cell(s)) is less often performed by these end user devices which may alleviate the congestion at other cells. In one or more embodiments, the cell barring can be performed and cell selection can be triggered without switching RAT's.

The networks of the system 100 can include one or more of a Universal Terrestrial Radio Access Network (UTRAN) 120, a Global System for Mobile communications (GSM) Enhanced Data rates for GSM Evolution (EDGE) Radio Access Network 130 (herein referred to as GERAN 130), and an E-UTRAN 140. The system 100 can further include one or more of a Serving General packet radio service (GPRS) Support Node (SGSN) 150, a Mobility Management Entity (MME) 160 and Mobile Switching Center (MSC) 180.

In one or more embodiments, system 100 can provide for circuit switching fallback for packet switching so as to enable the provisioning of voice and other circuit switching-domain services (e.g., circuit switching UDI video/LCS/USSD) by reuse of circuit switching infrastructure, such as when the end-user device 110 is served by E-UTRAN 140. In one or more embodiments, a circuit-switching fallback enabled terminal (e.g., end user device 110) connected to E-UTRAN 140 may use GERAN 130 or UTRAN 120 to connect to the circuit switching-domain. In one or more embodiments, the circuit switching fallback and Internet protocol Multimedia Subsystem (IMS)-based services of system 100 can co-exist in a single service operator's network.

In one or more embodiments, UTRAN 120 can include node B's and radio network controllers which enable carrying many traffic types including real-time circuit-switched to IP-based packet switched traffic. The UTRAN 120 can also enable connectivity between the end user device 110 and the core network. The UTRAN 120 can utilize a number of interfaces including Iu, Uu, Iub and/or Iur. For example, the Iu interface can be an external interface that connects the radio network controllers to the core network. The Uu can be an external interface that connects a node B with the end user device 110. The Iub can be an internal interface connecting the remote network controllers with the node B. The Iur interface can be an internal interface and/or external interface for connecting multiple remote network controllers.

In one or more embodiments, GERAN 130 can facilitate communications between base stations (e.g., Ater and Abis interfaces) and base station controllers (e.g., A interfaces).

In one or more embodiments, E-UTRAN 140 can be the air interface for the Long Term Evolution (LTE) upgrade path for mobile networks according to a $3^{rd}$ Generation Partnership Project (3GPP) specification. E-UTRAN 140 can include enodeBs on the network that are connected to each other such as via an X2 interface, which are connectable to the packet switch core network via an S1 interface. For example, E-UTRAN 140 can use various communication techniques including orthogonal frequency-division multiplexing (OFDM), multiple-input multiple-output (MIMO) antenna technology depending on the capabilities of the terminal, and beamforming for downlink to support more users, higher data rates and lower processing power required on each handset.

In one or more embodiments, the SGSN 150 can assume responsibility for delivery of data packets from and to mobile stations within the SGSN's geographical service or coverage area. The SGSN 150 can perform functions including packet routing and transfer, mobility management (e.g., attach/detach and location management), logical link management, and/or authentication and charging functions. In one or more embodiments, a location register of the SGSN 150 can store location information (e.g., current cell) and user profiles (e.g., addresses used in the packet data network) of users registered with the SGSN.

In one or more embodiments, MME 160 can perform the function of a control-node. For example, the MME 160 can perform functions such as idle mode tracking and paging procedure including retransmissions. The MME 160 can also choose a serving gateway for the end user device 110 such as at the initial attach and at time of intra-LTE handover involving node relocation.

In one or more embodiments, the MSC 180 can perform functions including routing voice calls and Short-Message Service (SMS), as well as other services (e.g., conference calls, FAX and circuit switched data) via setting up and releasing end-to-end connections, handling mobility and hand-over requirements during the communications, and/or performing charging and real time pre-paid account monitoring.

In one or more embodiments, the end user device 110 can generate RRCConnectionRequest messages where the content is set as follows: if upper layers provide an S-TMSI (e.g., the upper layers provide the S-TMSI if the UE is registered in the TA of the current cell) set the ue-Identity to the value received from upper layers otherwise draw a random value in a selected range and set the ue-Identity to this value; or set the establishmentCause in accordance with the information received from upper layers. The end user device 110 can submit the RRCConnectionRequest message to lower layers for transmission. The end user device 110 can continue cell re-selection related measurements as well as cell re-selection evaluation. If the conditions for cell re-selection are fulfilled, the end user device 110 can perform cell re-selection. In one or more embodiments, if upper layers abort the RRC connection establishment procedure while the end user device 110 has not yet entered the RRC connected state, the end user device 110 can stop timer T300 if running, and can reset MAC, release the MAC configuration and re-establish RLC for all RBs that are established.

In one or more embodiments, the end user device 110 can perform measurements for cell selection and reselection purposes. The NAS can control the RAT(s) in which the cell selection should be performed, for instance by indicating RAT(s) associated with the selected PLMN, and by maintaining a list of forbidden registration area(s) and a list of equivalent PLMNs. The end user device 110 can select a suitable cell based on idle mode measurements and cell selection criteria. In order to speed up the cell selection process, stored information for several RATs can be available in the end user device 110. When camped on a cell, the end user device 110 can regularly search for a better cell according to the cell reselection criteria. If a better cell is found, that cell is selected. The change of cell may result in a change of RAT. The NAS can be informed if the cell selection and reselection results in changes in the received system information relevant for NAS. For normal service, the end user device 110 can camp on a suitable cell, tune to that cell's control channel(s) so that the UE can receive system information from the PLMN while receiving registration area information from the PLMN (e.g., tracking area information) and receiving other AS and NAS Information; and if registered: receiving paging and notification messages from the PLMN and initiating transfer to a connected mode.

In one or more embodiments, the end user device 110 can utilize a number of different cell selection processes, such as in response to triggering of cell barring of a first cell. For example, an initial cell selection procedure can be employed that requires no prior knowledge of which RF channels are E-UTRA carriers. In this example, the end user device 110 can scan all or some of the RF channels in the E-UTRA bands according to its capabilities to find a suitable cell. In one or more embodiments, on each carrier frequency, the end user device 110 need only search for the strongest cell (e.g., the strongest signal). Once a suitable cell is found this cell can be selected by the end user device 110.

In another embodiment, the end user device 110 can employ a stored information cell selection procedure. This procedure may require stored information of carrier frequencies and/or information on cell parameters, such as from previously received measurement control information elements and/or from previously detected cells. In this example, once the end user device 110 has found a suitable cell the end user device can select it. If no suitable cell is found then the initial cell selection procedure described above may be employed. In one or more embodiments, priorities between different frequencies and/or RATs provided to the end user device 110 by system information or dedicated signaling may not be used in the cell selection process.

In one or more embodiments, a cell selection criterion can be applied during the cell selection process, such that the criterion S is fulfilled when Srxlev>0 and Squal is >0 where $Srxlev=Q_{rxlevmeas}-(Q_{rxlevmin}+Q_{rxlevminoffset})-Pcompensation$ and where $Squal=Q_{qualmeas}-(Q_{qualmin}+Q_{qualminoffset})$ and where:

| | |
|---|---|
| Srxlev | Cell selection RX level value (dB) |
| Squal | Cell selection quality value (dB) |
| $Q_{rxlevmeas}$ | Measured cell RX level value (RSRP) |
| $Q_{qualmeas}$ | Measured cell quality value (RSRQ) |
| $Q_{rxlevmin}$ | Minimum required RX level in the cell (dBm) |
| $Q_{qualmin}$ | Minimum required quality level in the cell (dB) |
| $Q_{rxlevminoffset}$ | Offset to the signalled $Q_{rxlevmin}$ taken into account in the Srxlev evaluation as a result of a periodic search for a higher priority PLMN while camped normally in a VPLMN |
| $Q_{qualminoffset}$ | Offset to the signalled $Q_{qualmin}$ taken into account in the Squal evaluation as a result of a periodic search for a higher priority PLMN while camped normally in a VPLMN |
| Pcompensation | $max(P_{EMAX}-P_{PowerClass}, 0)$ (dB) |
| $P_{EMAX}$ | Maximum TX power level an end user device may use when transmitting on the uplink in the cell (dBm) defined as $P_{EMAX}$ in |
| $P_{PowerClass}$ | Maximum RF output power of the UE (dBm) according to the end user device power class as defined in |

In one or more embodiments, the signaled values $Q_{rxlevmmoffset}$ and $Q_{qualminoffset}$ can be applied (e.g., only applied) when a cell is evaluated for cell selection as a result of a periodic search for a higher priority PLMN while camped normally in a VPLMN. During this periodic search for higher priority PLMN, the end user device 110 can check the S criteria of a cell using parameter values stored from a different cell of this higher priority PLMN. In one or more embodiments, a manual selection of CSGs can be supported by the end user device upon request from higher layers. In one or more embodiments, the examples can be applied to cell selection in E-UTRAN communications, while cell selection criteria and procedures for GSM and/or UTRAN may be different.

In one or more embodiments, on transition from an RRC connected state to an RRC idle state, the end user device 110 can attempt to camp on a suitable cell according to redirectedCarrierinfo, if included in the RRCConnectionRelease message. If the end user device 110 cannot find a suitable cell, the end user device may be allowed to camp on any suitable cell of the indicated RAT. If the RRCConnectionRelease message does not contain the redirectedCarrierinfo, the end user device 110 can attempt to select a suitable cell on an EUTRA carrier. If no suitable cell is found according to the above, the end user device 110 can perform a cell selection starting with the stored information cell selection procedure in order to find a suitable cell to camp on. When returning to the RRC idle state after the end user device 110 moved to the RRC connected state from camped on any cell state, the end user device 110 can attempt to camp on an acceptable cell according to redirectedCarrierinfo, if included in the RRCConnectionRelease message. If the end user device 110 cannot find an acceptable cell, the end user device 110 is allowed to camp on any acceptable cell of the indicated RAT. If the RRCConnectionRelease message does not contain redirectedCarrierinfo, the end user device 110 can attempt to select an acceptable cell on an EUTRA carrier. If no acceptable cell is found according to the above, the end user device 110 can continue to search for an acceptable cell of any PLMN in an any-cell-selection state.

In one or more embodiments, the end user device 110 can enter an any-cell-selection state, in which the end user device can attempt to find an acceptable cell of any PLMN to camp on, trying all RATs that are supported by the UE and searching first for a high quality cell such as defined in the 3GPP technical specification. The end user device 110, which is not camped on any cell, can stay in this state until an acceptable cell is found.

In one or more embodiments, the end user device 110 can seek to complete an RRC connection establishment prior to completing the establishment of an S1 connection (e.g., prior to receiving the UE context information from the EPC). During the initial phase of the RRC connection, the E-UTRAN may configure the end user device 110 to perform measurement reporting, but the end user device may only accept a handover message when security has been activated. E-UTRAN can release the RRC connection if an initial security activation and/or the radio bearer establishment fails (e.g., security activation and DRB establishment are triggered by a joint S1-procedure, which does not support partial success). The release of the RRC connection normally is initiated by E-UTRAN. The procedure may be used to re-direct the end user device 110 to an E-UTRA frequency or an inter-RAT carrier frequency. Under certain circumstances the end user device 110 may abort the RRC connection, (e.g., move to RRC idle state without notifying E-UTRAN).

Figure 2:
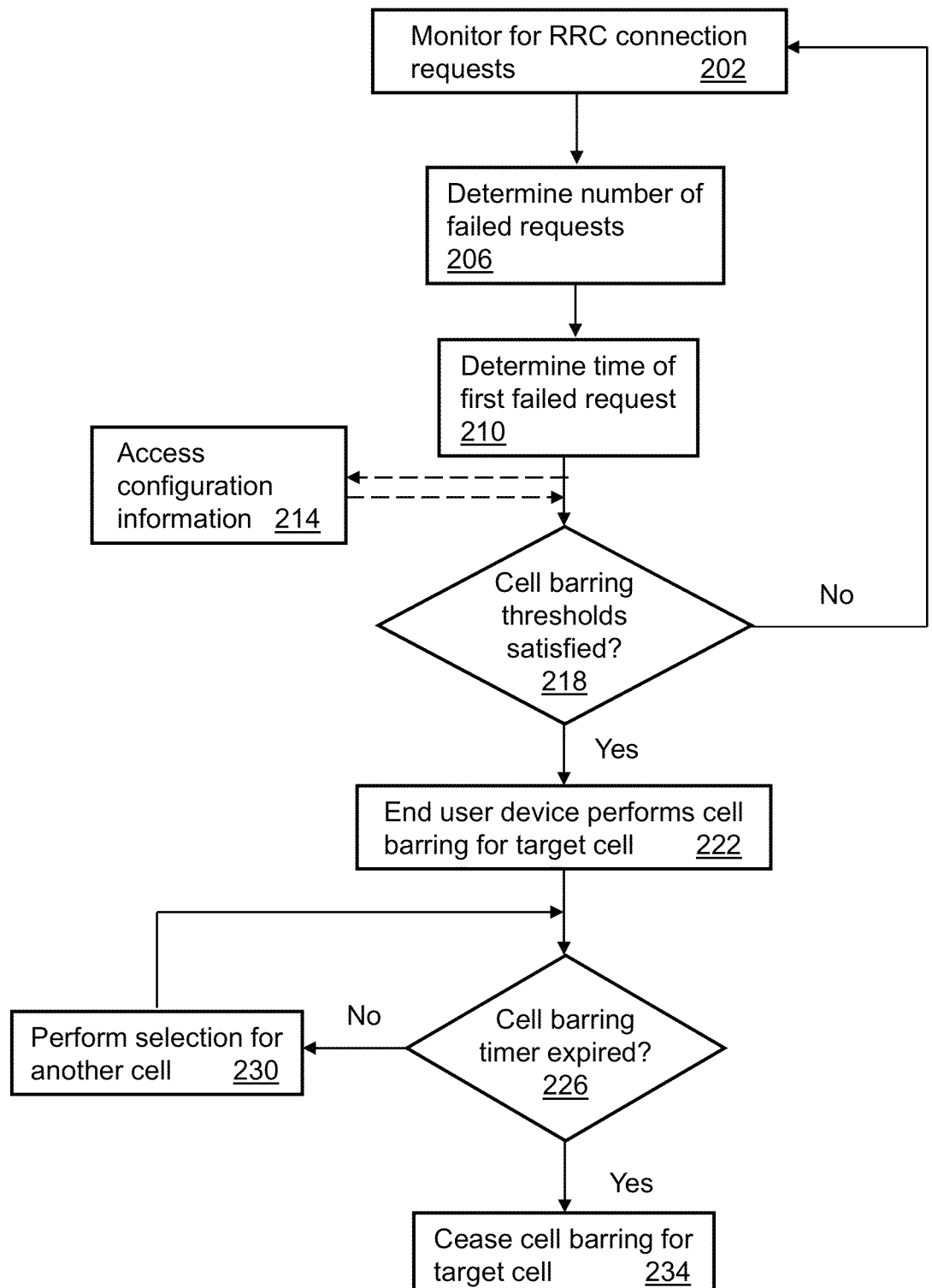
FIG. 2 depicts an illustrative embodiment of a method used in portions of the system described in FIG. 1.

FIG. 2 illustrates a method 200 for providing communication services. Method 200 is described with respect to end user device 110 but can be performed by one or more of the devices of system 100 and/or can be performed by other communication devices. Method 200 can begin at 202 in which the end user device 110 monitors for RRC connection requests being generated and transmitted by the end user device to a server of a first cell. The monitoring can include identifying failed requests, such as requests that have been ignored or requests that have been rejected. For example, the end user device can monitor for the requests and can then monitor for an RRCConnectionSetup message being returned by the server of the first cell or for an RRCConnectionReject message being returned by the server of the first cell. At 206 and 210, the end user device 110 can determine a number of failed RRC connection requests (e.g., a number of consecutive failed requests) and can determine the time period over which those failed requests occurred (e.g., by determining a transmission time associated with the first of the failed RRC connection requests).

In one embodiment at 214, the end user device 110 can access configuration information, such as over the network from a network element (e.g., a server associated with the first cell that the end user device is attempting to connect with). The configuration information can be of various types, including information that enables the end user device 110 to determine whether to perform cell barring, such as to alleviate cell overload.

In one or more embodiments, the configuration information can be threshold values that are directly to be applied by the end user device 110 in determining whether to perform cell barring, such as a maximum number of failed connection requests and/or a maximum time period over which the failed connection requests are to occur. In this example, the configuration information can be other threshold values that can be directly applied by the end user device 110 in determining other procedures to be implemented, such as a time period for cell barring to be performed by the end user device, a designation of cells to which cell barring is permitted and/or prohibited, and so forth.

In one or more embodiments, the configuration information can be network status data or other information that can be analyzed or otherwise processed by the end user device 110 to determine threshold values (e.g., a maximum number of failed requests and/or a maximum time period for attempting connection requests). In one or more embodiments, the end user device 110 can determine the threshold values and can transmit the determined threshold values back to the network element that provided the configuration information and/or to other network elements (e.g., a monitoring server of the network that compiles and analyzes thresholds being applied by end user devices in the network to facilitate performing network load balancing). In this example, the configuration information received by the end user device 110 may not be directly applicable to a selection of procedures and may require further analysis and manipulation by the end user device to determine data that can be directly applied, such as determining a maximum number of failed requests and a maximum time period for attempting connection requests based on monitored network resource usage data received from a server of a cell to which the end user device is transmitting RRC connections requests. In one or more embodiments, the network status data or other information can include historical information (e.g., peak traffic times, upcoming events expected to result in traffic increases), monitored resource usage information, monitored performance parameters (e.g., latency, jitter, packet loss, and so forth), and so forth.

In one or more embodiments, the configuration information can be a combination of threshold values (e.g., directly applicable without further analysis for determining control procedures) and network status data or other information (e.g., indirectly applicable via further analysis for determining control procedures).

At 218, it can be determine whether the cell barring threshold(s) has been satisfied. For example, it can be determined that N (a number) failed RRC connection requests were transmitted to the first cell over time period T1 by the end user device 110, where N and T1 were configuration information or were derived from configuration information by the end user device. If the cell barring threshold has not been satisfied then method 200 can return to 202 to continue monitoring RRC connection requests. If on the other hand, the cell barring threshold is satisfied then the end user device 110 can commence performing cell barring of the first cell at 222. The cell barring can be performed in a number of different ways so that RRC connection requests are not being transmitted by the end user device 110 to the first cell. As an example, the cell barring can be performed such that RRC connection requests may be generated at the end user device 110, but the end user device prevents transmission of the RRC connections requests to the first cell during the cell barring period. In one embodiment, the cell barring can be performed by a baseband processor of the end user device 110 so that RRC connection requests are analyzed and held if they are intended to be transmitted to the first cell during the cell barring period.

At 226, it can be determined whether a cell barring timer implemented at the end user device 110 has expired. In one embodiment, the timer can be based on a time period T2 that is designated by or derived from the configuration information accessed at 214. If the cell baring timer has not yet expired then the end user device at 230 can initiate a cell selection process, such as based on scanning of E-UTRAN band frequencies and cell strength detections. Other cell selection processes can also be utilized, including based on cell parameters retrieved from previous cell detection processes. The cell selection process can result in RRC connection requests being sent to one or more second cells in an effort to establish an RRC connection with one of those second cells. If on the other hand the cell barring timer has expired, then at 234 the end user device 110 can cease the cell barring for the first cell. By ceasing the cell barring of the first cell, the end user device 110 can consider the first cell in a cell selection process and/or can transmit another RRC connection request to the first cell.

Figure 3:
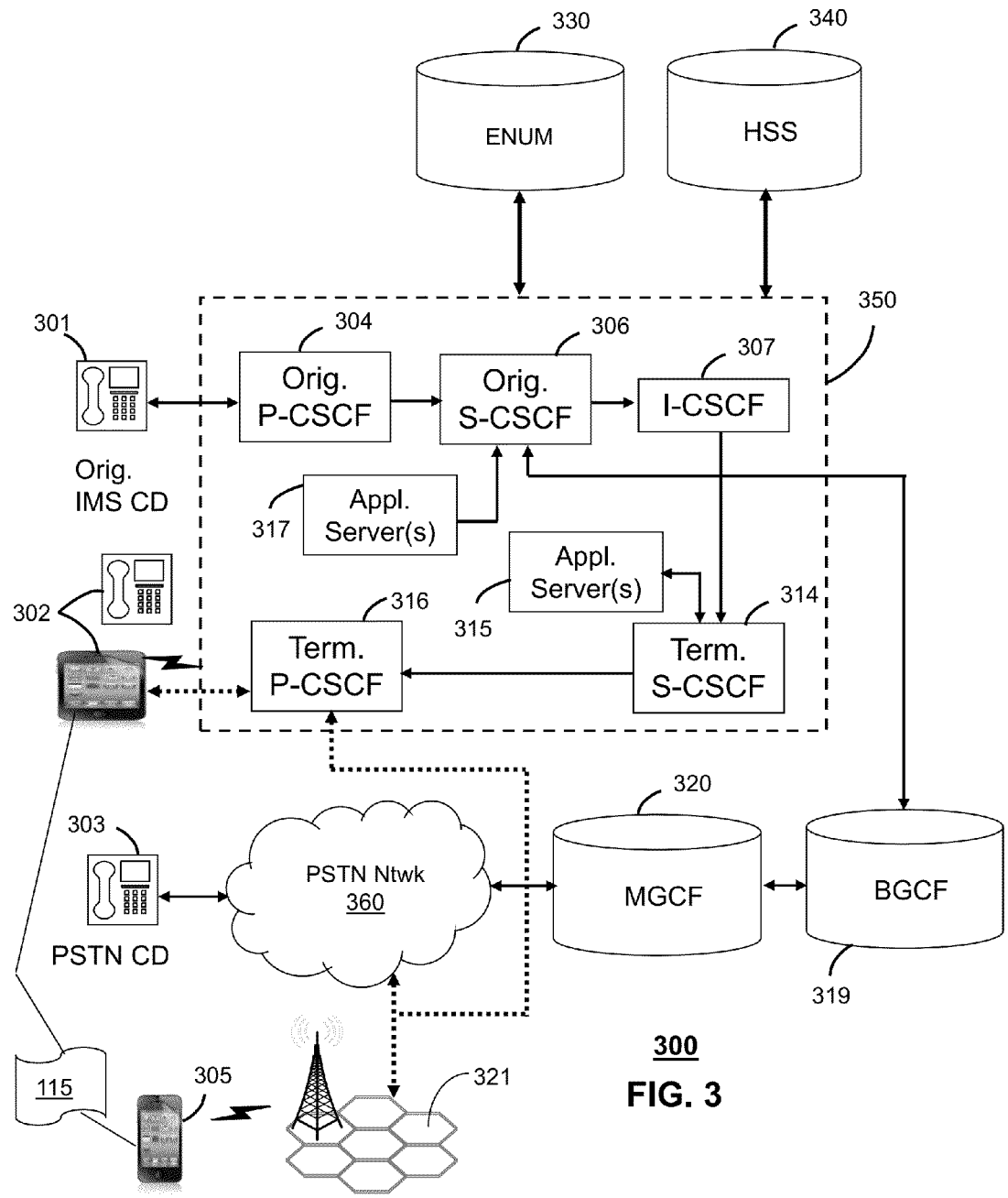
FIG. 3 depicts an illustrative embodiment of a communication system that provides communications services.

FIG. 3 depicts an illustrative embodiment of a communication system 300 employing an IP Multimedia Subsystem (IMS) network architecture to facilitate the combined services of circuit-switched and packet-switched systems. Communication system 300 can be overlaid or operably coupled with system 100 of FIG. 1 as another representative embodiment of communication system 100. System 300 enables end user devices to utilize a heuristic algorithm to detect E-UTRAN cell overload and a mechanism to recover service on a different cell/RAT/PLMN. For example, when N or more consecutive RRC connection requests are rejected or ignored on the same E-UTRAN cell and time T1 has passed since the first reject/ignore, then the end user device can bar the serving EUTRAN cell for the duration of time T2. As the result of cell barring, the end user device can perform cell selection/PLMN selection to recover service on another suitable cell/RAT/PLMN. In one or more embodiments N, T1 and/or T2 are end user device-based parameters that are FOTA configurable. In one or more embodiments, the end user device can receive network status data from a remote source and can analyze the network status data to determine the values of N, T1 and/or T2. The network status data can be various types of data including historical traffic information, current network performance data, scheduled maintenance, and so forth.

Communication system 300 can comprise a Home Subscriber Server (HSS) 340, a tElephone NUmber Mapping (ENUM) server 330, and other network elements of an IMS network 350. The IMS network 350 can establish communications between IMS-compliant communication devices (CDs) 301, 302, Public Switched Telephone Network (PSTN) CDs 303, 305, and combinations thereof by way of a Media Gateway Control Function (MGCF) 320 coupled to a PSTN network 360. The MGCF 320 need not be used when a communication session involves IMS CD to IMS CD communications. A communication session involving at least one PSTN CD may utilize the MGCF 320.

IMS CDs 301, 302 can register with the IMS network 350 by contacting a Proxy Call Session Control Function (P-CSCF) which communicates with an interrogating CSCF (I-CSCF), which in turn, communicates with a Serving CSCF (S-CSCF) to register the CDs with the HSS 340. To initiate a communication session between CDs, an originating IMS CD 301 can submit a Session Initiation Protocol (SIP INVITE) message to an originating P-CSCF 304 which communicates with a corresponding originating S-CSCF 306. The originating S-CSCF 306 can submit the SIP INVITE message to one or more application servers (ASs) 317 that can provide a variety of services to IMS subscribers.

For example, the application servers 317 can be used to perform originating call feature treatment functions on the calling party number received by the originating S-CSCF 306 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 306 can submit queries to the ENUM system 330 to translate an E.164 telephone number in the SIP INVITE message to a SIP Uniform Resource Identifier (URI) if the terminating communication device is IMS-compliant. The SIP URI can be used by an Interrogating CSCF (I-CSCF) 307 to submit a query to the HSS 340 to identify a terminating S-CSCF 314 associated with a terminating IMS CD such as reference 302. Once identified, the I-CSCF 307 can submit the SIP INVITE message to the terminating S-CSCF 314. The terminating S-CSCF 314 can then identify a terminating P-CSCF 316 associated with the terminating CD 302. The P-CSCF 316 may then signal the CD 302 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 3 may be interchangeable. It is further noted that communication system 300 can be adapted to support video conferencing. In addition, communication system 300 can be adapted to provide the IMS CDs 301, 302 with the services of communication system 100 of FIG. 1.

If the terminating communication device is instead a PSTN CD such as CD 303 or CD 305 (in instances where the cellular phone only supports circuit-switched voice communications), the ENUM system 330 can respond with an unsuccessful address resolution which can cause the originating S-CSCF 306 to forward the call to the MGCF 320 via a Breakout Gateway Control Function (BGCF) 319. The MGCF 320 can then initiate the call to the terminating PSTN CD over the PSTN network 360 to enable the calling and called parties to engage in voice and/or data communications.

It is further appreciated that the CDs of FIG. 3 can operate as wireline or wireless devices. For example, the CDs of FIG. 3 can be communicatively coupled to a cellular base station 321, a femtocell, a WiFi router, a Digital Enhanced Cordless Telecommunications (DECT) base unit, or another suitable wireless access unit to establish communications with the IMS network 350 of FIG. 3. The cellular access base station 321 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 3.

Cellular phones supporting LTE can support packet-switched voice and packet-switched data communications and thus may operate as IMS-compliant mobile devices. In this embodiment, the cellular base station 321 may communicate directly with the IMS network 350 as shown by the arrow connecting the cellular base station 321 and the P-CSCF 316.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

Wireless CDs 302 and 305 can be adapted with software to perform management function 115 to manage RRC connection requests, cell barring and/or cell selection.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as 3GPP. It is further noted that some or all embodiments of the subject disclosure may in whole or in part modify, supplement, or otherwise supersede final or proposed standards published and promulgated by 3GPP.

Figure 4:
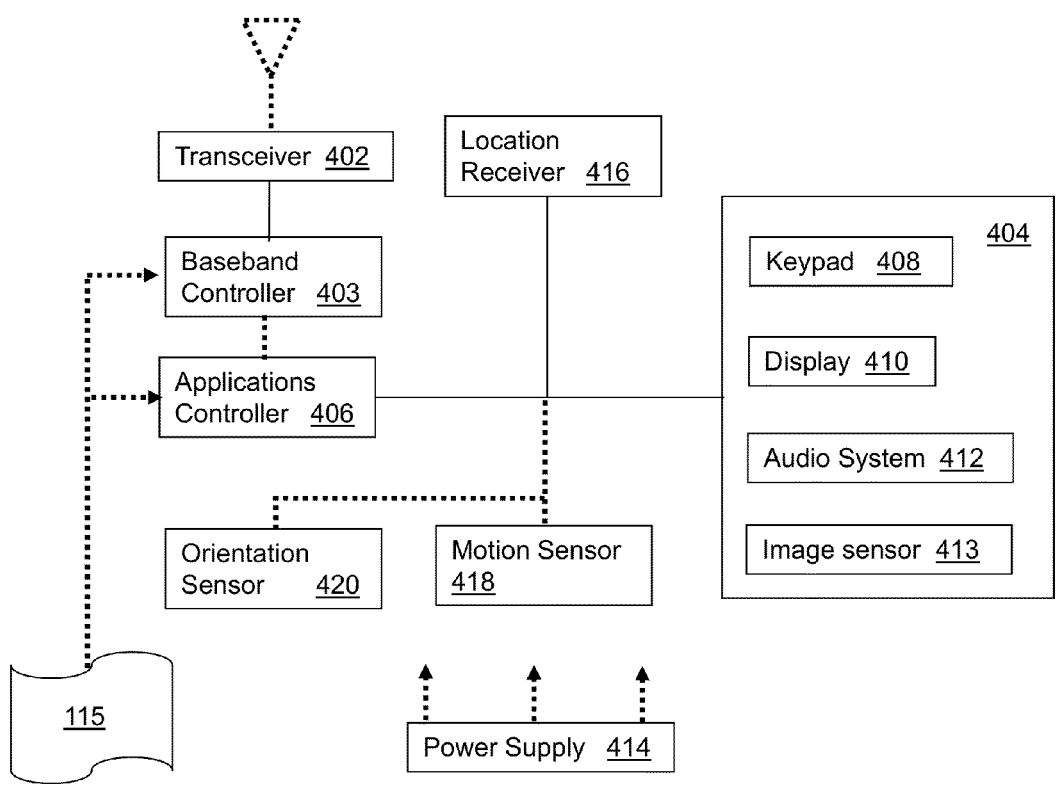
FIG. 4 depicts an illustrative embodiment of a communication device operable in the system of FIG. 1.

FIG. 4 depicts an illustrative embodiment of a communication device 400. Communication device 400 can serve in whole or in part as an illustrative embodiment of the devices depicted in FIG. 1. Device 400 can enable cell barring to be performed in order to alleviate cell overload or other undesired conditions in which a cell may want to limit its traffic and/or the device may want to utilize a different cell. The initiation of cell barring by the device 400 can be based on monitoring the results of RRC connection requests being sent by the device 400 to the cell. For example, the device 400 can count the number of consecutive RRC connection request failures over a pre-determined time period to determine whether a threshold has been satisfied that triggers the cell barring of the particular cell. The threshold can be established based on information received by the device 400 from a remote source, such as a remote server of the cell and/or another end user device attempting an RRC connection with the same cell.

To enable these features, communication device 400 can comprise a wireline and/or wireless transceiver 402 (herein transceiver 402), a user interface (UI) 404, a power supply 414, a location receiver 416, a motion sensor 418, an orientation sensor 420, and a controller 406 for managing operations thereof. The transceiver 402 can support short-range or long-range wireless access technologies such as Bluetooth, ZigBee, WiFi, DECT, or cellular communication technologies, just to mention a few. Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 402 can also be adapted to support circuit-switched wireline access technologies (such as PSTN), packet-switched wireline access technologies (such as TCP/IP, VoIP, etc.), and combinations thereof.

The UI 404 can include a depressible or touch-sensitive keypad 408 with a navigation mechanism such as a roller ball, a joystick, a mouse, or a navigation disk for manipulating operations of the communication device 400. The keypad 408 can be an integral part of a housing assembly of the communication device 400 or an independent device operably coupled thereto by a tethered wireline interface (such as a USB cable) or a wireless interface supporting for example Bluetooth. The keypad 408 can represent a numeric keypad commonly used by phones, and/or a QWERTY keypad with alphanumeric keys. The UI 404 can further include a display 410 such as monochrome or color LCD (Liquid Crystal Display), OLED (Organic Light Emitting Diode) or other suitable display technology for conveying images to an end user of the communication device 400. In an embodiment where the display 410 is touch-sensitive, a portion or all of the keypad 408 can be presented by way of the display 410 with navigation features.

The display 410 can use touch screen technology to also serve as a user interface for detecting user input. As a touch screen display, the communication device 400 can be adapted to present a user interface with graphical user interface (GUI) elements that can be selected by a user with a touch of a finger. The touch screen display 410 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 410 can be an integral part of the housing assembly of the communication device 400 or an independent device communicatively coupled thereto by a tethered wireline interface (such as a cable) or a wireless interface.

The UI 404 can also include an audio system 412 that utilizes audio technology for conveying low volume audio (such as audio heard in proximity of a human ear) and high volume audio (such as speakerphone for hands free operation). The audio system 412 can further include a microphone for receiving audible signals of an end user. The audio system 412 can also be used for voice recognition applications. The UI 404 can further include an image sensor 413 such as a charged coupled device (CCD) camera for capturing still or moving images.

The power supply 414 can utilize common power management technologies such as replaceable and rechargeable batteries, supply regulation technologies, and/or charging system technologies for supplying energy to the components of the communication device 400 to facilitate long-range or short-range portable applications. Alternatively, or in combination, the charging system can utilize external power sources such as DC power supplied over a physical interface such as a USB port or other suitable tethering technologies.

The location receiver 416 can utilize location technology such as a global positioning system (GPS) receiver capable of assisted GPS for identifying a location of the communication device 400 based on signals generated by a constellation of GPS satellites, which can be used for facilitating location services such as navigation. The motion sensor 418 can utilize motion sensing technology such as an accelerometer, a gyroscope, or other suitable motion sensing technology to detect motion of the communication device 400 in three-dimensional space. The orientation sensor 420 can utilize orientation sensing technology such as a magnetometer to detect the orientation of the communication device 400 (north, south, west, and east, as well as combined orientations in degrees, minutes, or other suitable orientation metrics).

The communication device 400 can use the transceiver 402 to also determine a proximity to a cellular, WiFi, Bluetooth, or other wireless access points by sensing techniques such as utilizing a received signal strength indicator (RSSI) and/or signal time of arrival (TOA) or time of flight (TOF) measurements. The controller 406 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 400.

Other components not shown in FIG. 4 can be used in one or more embodiments of the subject disclosure. For instance, the communication device 400 can include a reset button (not shown). The reset button can be used to reset the controller 406 of the communication device 400. In yet another embodiment, the communication device 400 can also include a factory default setting button positioned, for example, below a small hole in a housing assembly of the communication device 400 to force the communication device 400 to re-establish factory settings. In this embodiment, a user can use a protruding object such as a pen or paper clip tip to reach into the hole and depress the default setting button. The communication device 400 can also include a slot for adding or removing an identity module such as a Subscriber Identity Module (SIM) card. SIM cards can be used for identifying subscriber services, executing programs, storing subscriber data, and so forth.

The communication device 400 as described herein can operate with more or less of the circuit components shown in FIG. 4. These variant embodiments can be used in one or more embodiments of the subject disclosure.

The communication device 400 can be adapted to perform the functions of the communication devices of FIG. 1, as well as the IMS CDs 301-302 and PSTN CDs 303-305 of FIG. 3. It will be appreciated that the communication device 400 can also represent other devices that can operate in communication system 100 of FIG. 1 such as a wireless gaming console or a wireless media player.

The communication device 400 (such as via baseband controller 403 and/or applications controller 406) can be adapted in various embodiments to perform the functions 115 described with respect to FIG. 1, including determining a triggering event for the cell barring and/or performing the cell barring.

In one or more embodiments, management functions 115 (e.g., determining triggering events for performing cell barring and/or implementing cell barring) can be performed by the baseband controller 403 and/or the applications controller 406 of device 400. In one embodiment, the baseband controller 403 can manage all of the long-distance radio functions, which may not include WiFi and/or Bluetooth communications. For example, the baseband processor 403 can utilize its own RAM and/or firmware. The baseband processor 403 due to the radio control functions (signal modulation, encoding, radio frequency shifting, etc.) can be highly timing dependent, and can utilize a real time operating system. In one embodiment, the baseband processor 403 can operate using an operating system that is distinct from an operating system of the applications processor 406.

Device 400 can include various other components that may or may not be illustrated in FIG. 4, including power amplifiers, antennas, memory, user interfaces, SIM card, clock oscillator, battery and so forth. The components of device 400 can be arranged in various configurations, including positioning the baseband processor 403 between the applications processor 406 and the transceiver 402 to facilitate the control exerted by the baseband processor to prevent (temporarily or otherwise) RRC connection requests from being transmitted to a first cell while allowing other RRC connection requests to be transmitted to one or more second cells.

Upon reviewing the aforementioned embodiments, it would be evident to an artisan with ordinary skill in the art that said embodiments can be modified, reduced, or enhanced without departing from the scope of the claims described below. For example, configuration information can be shared peer-to-peer rather than or in combination with a centralized distribution of the configuration information. For example, a first end user device can receive configuration information, such as cell barring threshold values and/or network status data from which cell barring thresholds can be determined, from a second end user device that is operating in or within proximity to a first cell to which the configuration information applies.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

In one or more embodiments, an RRC connection establishment by the end user device 110 can involve SRB1 establishment. This procedure can also be utilized in transferring initial NAS dedicated information/message from the end user device 110 to the E-UTRAN. For example, the end user device 110 can initiate a procedure for SRB1 establishment when upper layers request establishment of an RRC connection while the end user device is in an RRC idle state. Upon initiation of the procedure, the end user device 110 can perform a number of functions:

1>if upper layers indicate that the RRC connection is subject to EAB:
  2>if the result of the EAB check is that access to the cell is barred:
    3>inform upper layers about the failure to establish the RRC connection and that EAB is applicable, upon which the procedure ends;
1>if the UE is establishing the RRC connection for mobile terminating calls:
  2>if timer T302 is running:
    3>inform upper layers about the failure to establish the RRC connection and that access barring for mobile terminating calls is applicable, upon which the procedure ends;
1>else if the end user device is establishing the RRC connection for emergency calls:
  2>if SystemInformationBlockType2 includes the ac-BarringInfo:

3>if the ac-BarringForEmergency is set to TRUE:
    4>if the end user device has one or more Access Classes, as stored on the USIM, with a value in the range 11 . . . 15, which is valid for the UE to use:
        5>if the ac-BarringInfo includes ac-BarringForMO-Data, and for all of these valid Access Classes for the UE, the corresponding bit in the ac-BarringForSpecialAC contained in ac-BarringForMO-Data is set to one:
            6>consider access to the cell as barred;
    4>else:
        5>consider access to the cell as barred;
2>if access to the cell is barred:
    3>inform upper layers about the failure to establish the RRC connection, upon which the procedure ends;
1>else if the end user device is establishing the RRC connection for mobile originating calls:
    2>perform access barring check using T303 as "Tbarring" and ac-BarringForMO-Data as "AC barring parameter";
    2>if access to the cell is barred:
        3>if SystemInformationBlockType2 includes ac-BarringForCSFB or the end user device does not support CS fallback:
            4>inform upper layers about the failure to establish the RRC connection and that access barring for mobile originating calls is applicable, upon which the procedure ends;
        3>else (SystemInformationBlockType2 does not include ac-BarringForCSFB and the end user device supports CS fallback):
            4>if timer T306 is not running, start T306 with the timer value of T303;
            4>inform upper layers about the failure to establish the RRC connection and that access barring for mobile originating calls and mobile originating CS fallback is applicable, upon which the procedure ends;
1>else if the end user device is establishing the RRC connection for mobile originating signalling:
    2>perform access barring check using T305 as "Tbarring" and ac-BarringForMO-Signalling as "AC barring parameter";
    2>if access to the cell is barred:
        3>inform upper layers about the failure to establish the RRC connection and that access barring for mobile originating signalling is applicable, upon which the procedure ends;
1>else (the end user device is establishing the RRC connection for mobile originating CS fallback):
    2>if SystemInformationBlockType2 includes ac-BarringForCSFB:
        3>perform access barring check using T306 as "Tbarring" and ac-BarringForCSFB as "AC barring parameter";
        3>if access to the cell is barred:
            4>inform upper layers about the failure to establish the RRC connection and that access barring for mobile originating CS fallback is applicable, due to ac-BarringForCSFB, upon which the procedure ends;
    2>else:
        3>perform access barring check using T306 as "Tbarring" and ac-BarringForMO-Data as "AC barring parameter";
        3>if access to the cell is barred:
            4>if timer T303 is not running, start T303 with the timer value of T306;
            4>inform upper layers about the failure to establish the RRC connection and that access barring for mobile originating CS fallback and mobile originating calls is applicable, due to ac-BarringForMO-Data, upon which the procedure ends;
1>apply the default physical channel configuration;
1>apply the default semi-persistent scheduling configuration;
1>apply the default MAC main configuration;
1>apply the CCCH configuration;
1>apply the timeAlignmentTimerCommon included in SystemInformationBlockType2;
1>start timer T300;
1>initiate transmission of the RRCConnectionRequest message.

Figure 5:
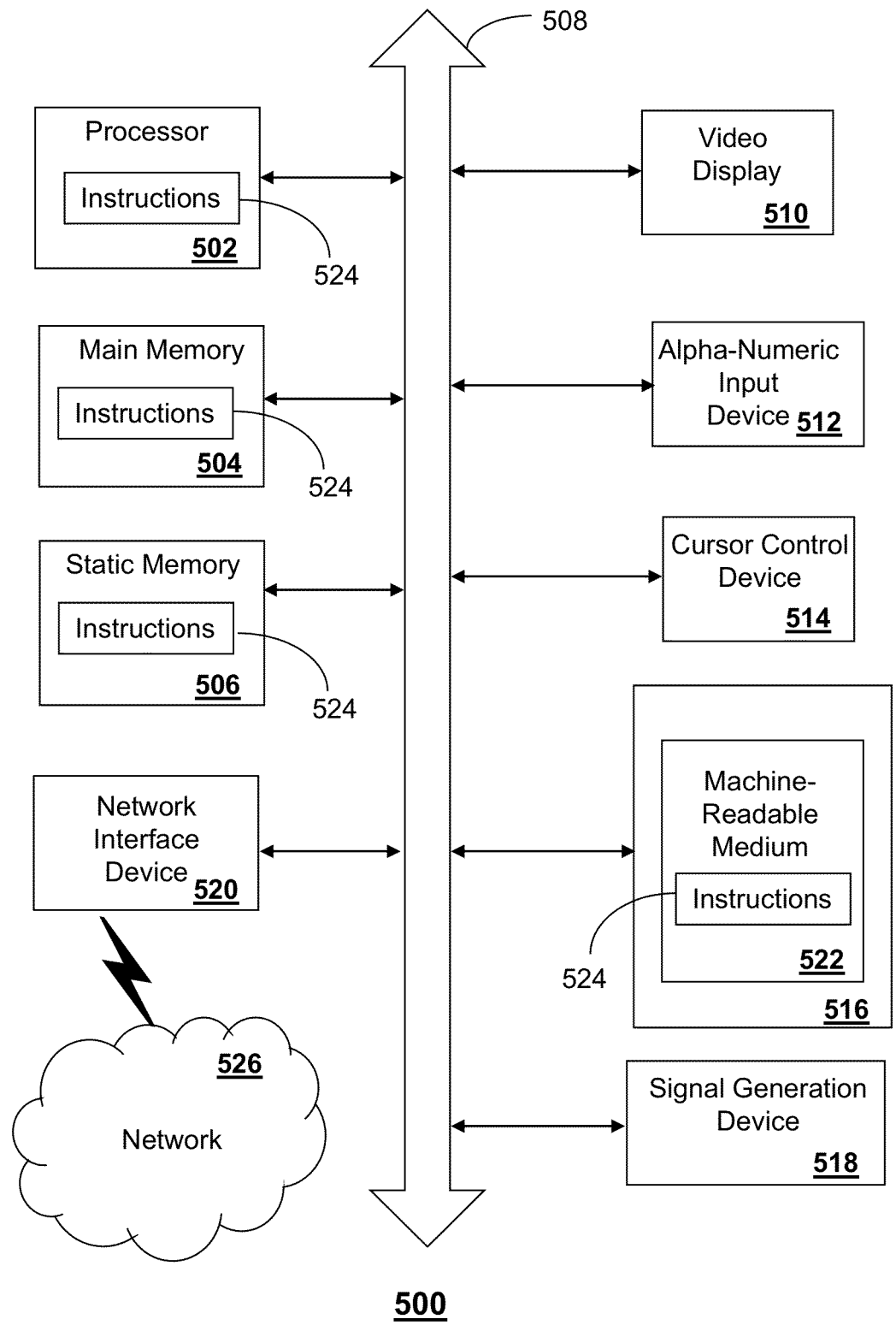
FIG. 5 is a diagrammatic representation of a machine in the form of a computer system within which a set of instructions, when executed, may cause the machine to perform any one or more of the methods described herein.

FIG. 5 depicts an exemplary diagrammatic representation of a machine in the form of a computer system 500 within which a set of instructions, when executed, may cause the machine to perform any one or more of the methods described above. For example, system 500 can enable end user devices to detect a packet-switching service initiation request and process the initiation request in a manner that allows selected currently running timers and/or selected procedures to be retained or otherwise completed. One or more instances of the machine can operate, for example, as the end user device 110, the communication device 400 and other devices of FIGS. 1-4. In some embodiments, the machine may be connected (e.g., using a network 526) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 500 may include a processor (or controller) 502 (e.g., a central processing unit (CPU), a graphics processing unit (GPU, or both), a main memory 504 and a static memory 506, which communicate with each other via a bus 508. The computer system 500 may further include a display unit 510 (e.g., a liquid crystal display (LCD), a flat panel, or a solid state display. The computer system 500 may include an input device 512 (e.g., a keyboard), a cursor control device 514 (e.g., a mouse), a disk drive unit 516, a signal generation device 518 (e.g., a speaker or remote control) and a network interface device 520. In distributed environments, the embodiments described in the subject disclosure can be adapted to utilize multiple display units 510 controlled by two or more computer systems 500. In this configuration, presentations described by the subject disclosure may in part be shown in a first of the display units 510, while the remaining portion is presented in a second of the display units 510.

The disk drive unit 516 may include a tangible computer-readable storage medium 522 on which is stored one or more sets of instructions (e.g., software 524) embodying any one or more of the methods or functions described herein, including those methods illustrated above. The instructions 524 may also reside, completely or at least partially, within the main memory 504, the static memory 506, and/or within the processor 502 during execution thereof by the computer system 500. The main memory 504 and the processor 502 also may constitute tangible computer-readable storage media.

Dedicated hardware implementations including, but not limited to, application specific integrated circuits, programmable logic arrays and other hardware devices that can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable array. Furthermore, software implementations (e.g., software programs, instructions, etc.) can include, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 522 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA, LTE) can be used by computer system 500.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, can be used in the subject disclosure.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A computer-readable storage device comprising computer instructions, which, responsive to being executed by a processor of a wireless communication device, cause the processor to perform operations comprising:
   receiving configuration information over a network, wherein the configuration information includes threshold parameters for a maximum number of connection requests and a maximum time period for transmitting the connection requests, and wherein the configuration information includes a cell barring time period for performing cell barring;
   monitoring for radio resource control connection requests being transmitted from the wireless communication device to a first server of a first cell of the network;
   determining a number of failed radio resource control connection requests based on the monitoring;

determining a time of a first failed radio resource control connection request of the failed radio resource control connection requests based on the monitoring;

determining whether the number of failed radio resource control connection requests and the time of the first failed radio resource control connection request satisfy a cell barring threshold based on the threshold parameters; and responsive to a determination that the cell barring threshold has been satisfied, causing the wireless communication device to perform cell selection for a second cell of the network and to perform the cell barring of the first cell.

2. The computer-readable storage device of claim 1, wherein the operations further comprise:

responsive to expiration of the cell barring time period, transmitting an additional radio resource control connection request from the wireless communication device to the first server of the first cell of the network.

3. The computer-readable storage device of claim 1, wherein the receiving of the configuration information over the network is from a third server of a third cell of the network, wherein the wireless communication device establishes a radio resource control connection with the third cell prior to transmitting the radio resource control connection requests to the first server of the first cell of the network.

4. The computer-readable storage device of claim 1, wherein the monitoring is performed during a radio resource control idle state of the wireless communication device, wherein the processor is a based band processor of the wireless communication device, wherein the radio resource control connection requests are generated by an applications processor of the wireless communication device, wherein the cell selection is performed without switching radio access technologies, and wherein the network comprises an evolved universal terrestrial radio access network.

5. The computer-readable storage device of claim 1, wherein the configuration information is not received according to network load balancing.

6. The computer-readable storage device of claim 1, wherein the cell selection comprises:

scanning radio frequency channels in evolved universal terrestrial radio access frequency bands; and detecting a strongest cell signal based on the scanning, wherein the strongest cell signal corresponds to the second cell from among a group of cells corresponding to the evolved universal terrestrial radio access frequency bands, and wherein the operations further comprise:

responsive to the detecting of the strongest cell signal, transmitting an additional radio resource control connection request from the wireless communication device to a second server of the second cell.

7. The computer-readable storage device of claim 1, wherein the cell selection comprises:

receiving cell parameters from cells detected by the wireless communication device;

storing the cell parameters; and determining cell suitability based on receipt level values and quality values according to the cell parameters, wherein the second cell is selected based on the cell suitability.

8. A method comprising:

receiving, by a processor of a wireless communication device, configuration information over a network, the configuration information including threshold parameters and a cell barring time period for performing cell barring;

monitoring, by the processor, for radio resource control connection requests being transmitted from the wireless communication device to a first server of a first cell of the network;

determining, by the processor, a number of failed radio resource control connection requests based on the monitoring;

determining, by the processor, a time of a first failed radio resource control connection request of the failed radio resource control connection requests based on the monitoring;

determining, by the processor, whether the number of failed radio resource control connection requests and the time of the first failed radio resource control connection request satisfy a cell barring threshold based on the threshold parameters; and responsive to a determination that the cell barring threshold has been satisfied, causing the wireless communication device to perform cell selection for a second cell of the network and to perform the cell barring of the first cell.

9. The method of claim 8, wherein the processor is a baseband processor, and wherein the radio resource control connection requests are generated by an applications processor of the wireless communication device.

10. The method of claim 9, wherein the baseband processor and the applications processor utilize different operating systems, and wherein all communications between other communication devices and the applications processor are processed via the baseband processor.

11. The method of claim 8, wherein the configuration information comprises network status data, and further comprising:

analyzing, by the processor, the network status data to determine a maximum number of the failed radio resource control connection requests and to determine a maximum time period for transmission of the failed radio resource control connection requests, wherein the determination that the cell barring threshold has been satisfied is based on the maximum number of failed radio resource control connection requests and the maximum time period for transmission of the failed radio resource control connection requests.

12. The method of claim 11, wherein the network status data comprises historical information associated with network traffic for the first cell.

13. The method of claim 8, further comprising:

responsive to expiration of the cell barring time period, transmitting an additional radio resource control connection request from the wireless communication device to the first server of the first cell of the network.

14. The method of claim 8, wherein the receiving of the configuration information over the network is from a third server of a third cell of the network, wherein the wireless communication device establishes a radio resource control connection with the third cell prior to transmitting the radio resource control connection requests to the first server of the first cell of the network, and wherein the network comprises an evolved universal terrestrial radio access network.

15. The method of claim 8, wherein the cell selection comprises scanning radio frequency channels in evolved universal terrestrial radio access frequency bands; and detecting a strongest cell signal based on the scanning, wherein the strongest cell signal corresponds to the second cell from among a group of cells corresponding to the evolved universal terrestrial radio access frequency bands, and further comprising:

responsive to the detecting of the strongest cell signal, transmitting an additional radio resource control connection request from the wireless communication device to a second server of the second cell.

16. The method of claim 8, wherein the cell selection comprises: receiving cell parameters from detected cells; storing the cell parameters; and determining cell suitability based on receipt level values and quality values according to the cell parameters, wherein the second cell is selected based on the cell suitability.

17. The method of claim 8, further comprising:
responsive to the cell selection, transmitting an additional radio resource control connection request from the wireless communication device to a second server of the second cell.

18. A computer-readable storage device comprising computer instructions, which, responsive to being executed by a baseband processor of a wireless communication device, cause the baseband processor to perform operations comprising:
accessing configuration information;
monitoring an applications processor of the wireless communication device to identify radio resource control connection requests being generated by the applications processor, the radio resource control connection requests being generated by the applications processor for transmission by the baseband processor to a first server of a first cell of a network;
determining whether failed radio resource control connection requests satisfy a cell barring threshold based on the monitoring and based on the configuration information; and
responsive to a determination that the cell barring threshold has been satisfied, causing the wireless communication device to perform cell selection for a second cell of the network and to perform cell barring of the first cell.

19. The computer-readable storage device of claim 18, wherein the baseband processor and the applications processor utilize different operating systems, wherein all communications between other communication devices and the applications processor are processed via the baseband processor, and wherein the operations further comprise:
responsive to the cell selection, transmitting an additional radio resource control connection request from the wireless communication device to a second server of the second cell.

20. The computer-readable storage device of claim 18, wherein the determination that the cell barring threshold has been satisfied is based on a maximum number of the failed radio resource control connection requests defined by the configuration information.

\* \* \* \* \*